July 12, 1949.                W. D. SEYFRIED                2,475,993
                        CATALYTIC CONVERSION PROCESS
                            Filed May 9, 1947
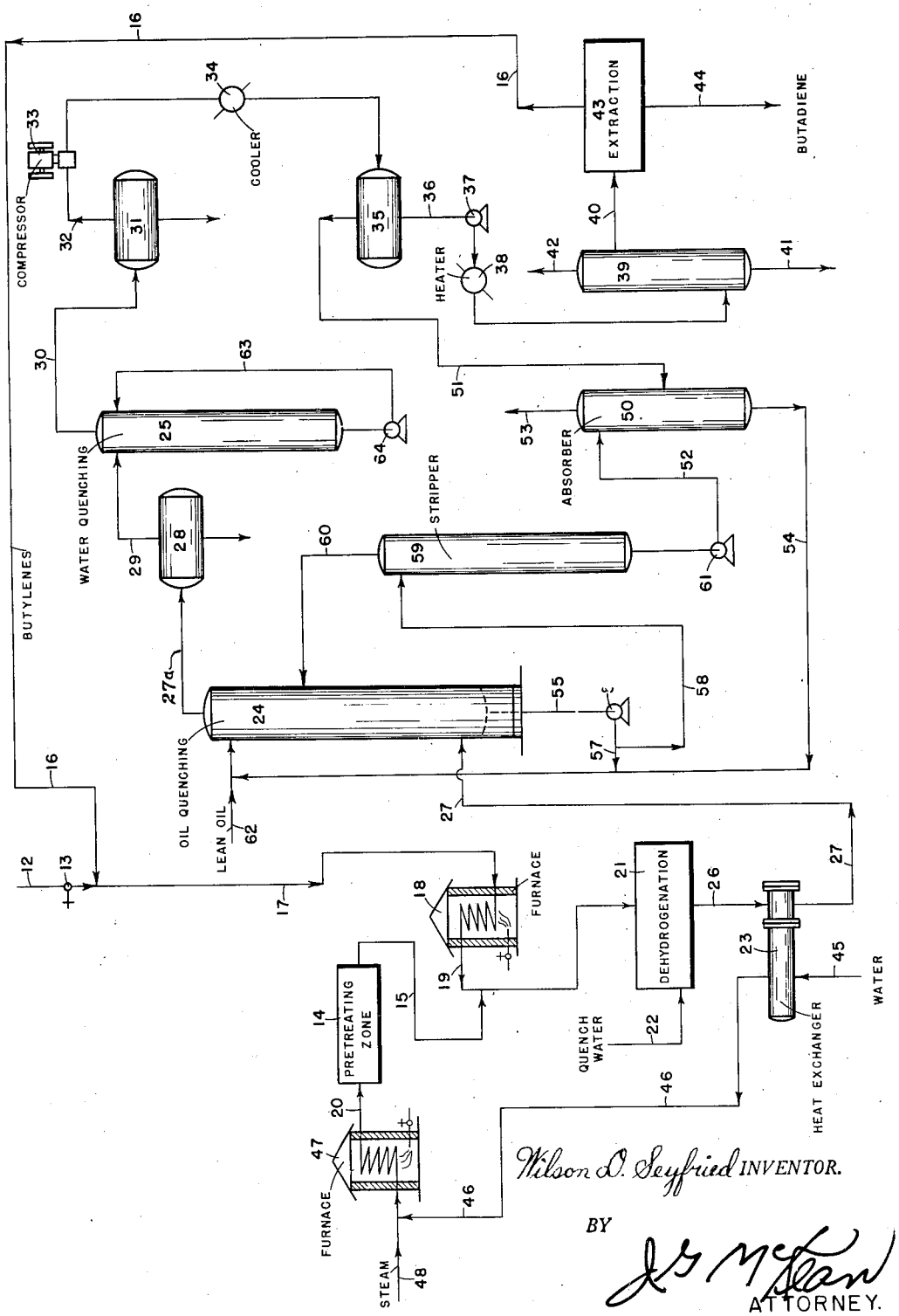
Wilson D. Seyfried INVENTOR.
BY
J G McLean
ATTORNEY.

Patented July 12, 1949

2,475,993

UNITED STATES PATENT OFFICE 2,475,993

CATALYTIC CONVERSION PROCESS

Wilson D. Seyfried, Goose Creek, Tex., assignor, by mesne assignments, to Standard Oil Development Company, Elizabeth, N. J., a corporation of Delaware Application May 9, 1947, Serial No. 747,107

2 Claims. (Cl. 260—680)

The present invention is directed to a method for eliminating catalyst poisons from catalytic reactions. More specifically, the invention is directed to the catalytic dehydrogenation of hydrocarbons to less saturated hydrocarbons. In its more specific aspects, the invention is directed to the elimination of catalyst poisons introduced in the diluent employed in the catalytic dehydrogenation of hydrocarbons to less saturated hydrocarbons.

The production of butadiene from butylenes by dehydrogenation is a well known art. For example, it has been known to pass a mixture of normal butylenes over a suitable dehydrogenation catalyst such as nickel-chromium phosphate at temperatures in the range of 1100° to about 1300° F., said feed stock being diluted with steam to reduce the partial pressure of the butylenes and therefore minimize the formation of carbon on the catalyst. It has also been known to conduct the foregoing dehydrogenation reaction of hydrocarbons at space velocities of 150 volumes per volume of catalyst per hour to about 300 volumes of hydrocarbon per volume of catalyst per hour. Likewise, it is conventional practice to regenerate periodically the catalyst by burning off the catalyst by passing a mixture of air and steam over the catalyst in the range of 75 to 175 volumes of air per volume of catalyst per hour and at steam space velocities of 1500 to 6,000 volumes per volume of catalyst per hour. It is well known further to conduct the reaction in a plurality of catalyst cases with one catalyst case being on the reaction cycle and the other being on the regeneration cycle, thus allowing intermittent continuous operation of the dehydrogenation reaction; as soon as the catalyst in one reactor case loses its activity for the dehydrogenation reaction, it is taken off the reaction cycle and placed on the regeneration cycle and a regenerated catalyst case is placed on the reaction cycle, thus allowing the operation to be conducted continuously.

The reaction and the regeneration cycles are conducted at pressures from about 0 to 10 pounds per square inch gauge although higher pressures may be employed if desired.

The amount of steam employed as diluent for the reaction is usually in the ratio of about 10 to 20:1 or higher so that the reaction will occur with the proper partial pressure of hydrocarbons. If lower steam to hydrocarbon ratios are used, there is danger of substational carbon deposition on the catalyst with impairment of the efficiency and resultant shorter reaction cycles.

In conducting the foregoing type of reaction, it has been observed that poisons are introduced with the steam employed as a diluent. These poisons have been identified to be iron compounds which may be dissolved in the water used in generating steam or they may result from the steam eroding or corroding the lines through which it is conducted into the catalytic system. Regardless of the source of the poison, it is found that the presence of these small quantities of detrimental bodies or poisons, which have been identified in part as iron or iron compounds, substantially reduce the effectiveness of the catalytic conversion of butylenes to butadiene.

It is therefore the main object of the present invention to provide a method for removing poisons from diluents employed in the catalytic conversion of hydrocarbons.

Another object of the present invention is to provide a method for treating steam to remove iron and other detrimental bodies contained in it and make it suitable for use as a diluent in the dehydrogenation of hydrocarbons.

A more specific object of the invention is to provide a process for producing butadiene from butylenes by catalytic dehydrogenation of the latter in which longer periods of operation at lower temperatures and higher selectivities and at a higher conversion than possible heretofore by suitably treating the steam employed as a diluent for the reaction.

In accordance with the present invention, the foregoing objects are achieved by pretreating the steam employed in the catalytic conversion of hydrocarbons with an adsorbent material which selectively removes the poisons contained in the steam. Specifically, the present invention allows the removal of contaminating iron bodies from steam employed as a diluent in the catalytic dehydrogenation of butylenes to butadienes.

Briefly, the present invention may be described as involving the catalytic dehydrogenation of butylenes to butadienes in which a feed mixture of butylenes is heated to a temperature in the range of 1100° to 1300° F., following which it is admixed with a suitable amount of steam and passed into a dehydrogenation reactor containing a dehydrogenation catalyst. Prior to the admixture of the heated butylenes with the steam, the steam is heated to a temperature in the range between 1100° to 1300° F. and passed through a zone containing a suitable adsorbent, such as for example activated alumina, following which the treated steam is admixed with the butylenes and passed in admixture to the dehydrogenation zone.

The product issuing from the dehydrogenation zone has its temperature reduced by passage through an oil quench tower and a water quench tower, following which the products are subjected to separation into a liquid phase and a vapor phase with the liquid phase being subjected to an extraction treatment with a suitable solvent for separation of the butylenes from butadiene and recovery of the latter. The vapor phase is also subjected to an absorption and a stripping to recover valuable hydrocarbons contained therein.

In the above process without pretreatment of the steam by passage through a suitable adsorbent bed such as activated alumina, the activity of the catalyst may be reduced seriously in the dehydrogenation zone by introduction of iron or one of its compounds or other materials contained in the steam into the dehydrogenation zone along with the hydrocarbon feed stock and the steam diluent. Iron on the catalyst has the effect of making it go wild, that is, the conversion increases greatly with concurrent formation of oxides of carbon and lighter hydrocarbons and the selectivity of the reaction is therefore reduced sharply.

In accordance with the present invention, it has been found that contamination of the catalyst with iron or other detrimental bodies or poisons introduced with the steam diluent may be eliminated by pretreating the steam ahead of the reaction zone with activated alumina or other suitable adsorbents which may be a small portion of the catalyst itself used in the dehydrogenation zone. While activated alumina has been conveniently used, other adsorbents such as natural clays illustrated by kieselguhr, kaolinite, diatomaceous earth, gibbsite, montmorillonite, and various other similar adsorbents may be used. The material employed to pretreat the steam may be a small portion of the catalyst itself or it may be a small portion of spent catalyst, provided the spent catalyst has not lost its ability to adsorb further quantities of the contaminating bodies ordinarily present in the steam diluent.

An embodiment of the present invention will now be described in conjunction with the drawing in which the sole figure is in the form of a diagrammatic flow sheet.

Turning now specifically to the drawing, a hydrocarbon feed stream which may, for purposes of example, be a mixture of normal butylenes is introduced into the system through line 12 controlled by valve 13. The feed hydrocarbon passes from line 12 into line 17 and thence into furnace 18 where it is heated to a temperature in the range between 1150° and 1300° F. The heated hydrocarbons issue from furnace 18 by way of line 19 and are admixed therein with steam introduced by line 15 and the mixture then flows to dehydrogenation zone 21 where it is subjected to dehydrogenation conditions to cause the formation of less saturated material from the feed hydrocarbon. In this particular instance, the less saturated materials formed from the feed hydrocarbon will be butadiene.

The steam introduced into the system by way of line 15 into line 19, which passes into the dehydrogenation zone 21, is introduced into the system by way of line 48. It passes by way of line 48 into a furnace 47 where its temperature is raised to a temperature in the range of 1150° to 1300° F. The heated steam emerges from furnace 47 by way of line 20 and then passes into a pretreating zone 14 which may contain a suitable adsorbent of the type illustrated above. Briefly, zone 14 contains an adsorbent such as activated alumina in sufficient quantities to remove poisons which may be contained in the steam. These poisons are usually iron or its compounds, but other contaminating bodies may be present therein. As pointed out before, regardless of the identity of the poisons, adsorption or pretreating zone 14 effectively removes them from the steam on passage therethrough. The effluent from pretreating zone 14 is discharged by way of line 15 into line 19 where it is admixed with the heated hydrocarbons and serves as a diluent for the dehydrogenation reaction.

Following the dehydrogenation step, the temperature of the reaction products and the steam from the reaction zone is reduced as rapidly as possible by the introduction of a water spray into the lower portion of the dehydrogenation reaction zone by means of line 22, a heat exchanger 23, an oil quenching zone 24 and a water quenching zone 25. The mixture of hydrocarbon reaction products and steam is withdrawn from dehydrogenation reaction zone 21 by line 26 and passed to the heat exchanger 23, which is in the form of a waste heat boiler and is passed thence via line 27 to oil quenching zone 24. The vapors from the oil quenching zone pass through line 27a and into separator 28 to separate water from the hydrocarbons and the vapors are passed on through line 29 to water quenching tower 25. Vapors from water quenching tower 25 are withdrawn through line 30, pass into a second settling drum 31 to remove condensate from the vapors, and thence through line 32 containing compressor 33 and cooler 34 into separating vessel 35. The liquid accumulating in vessel 35 is the desired C₄ fraction and is withdrawn from the bottom of this vessel through line 36 containing pump 37 and heater 38 and into distillation tower 39, where the butadiene fraction may be removed as a side stream through line 40. A heavier fraction is withdrawn from the bottom of the tower through line 41 and a lighter fraction through line 42. The desirable fraction from side stream 40 may be sent to a butadiene extraction tower 43; a finished butadiene stream is withdrawn from the extraction tower through outlet 44 and a fraction comprising essentially butylenes is withdrawn from the extraction plant via line 16 for admixing with other fractions to form the feed as has been before described.

It is desirable to obtain at least a portion of the steam sent to the dehydrogenation zone from the waste heat boiler 23 and this may be done by passing water into the boiler through inlet 45 and steam is withdrawn from the boiler 23 through line 46 to furnace 47 where it is heated to a suitable temperature and then admixed by means of line 20 with the hydrocarbon feed flowing in line 19. If sufficient steam for the process is not produced by boiler 23, additional steam may be added to the system by inlet 48.

It is preferred to operate oil quenching tower 24 in conjunction with an absorber unit 50. In the separating vessel 35 for separating the C₄ fraction as a liquid, the uncondensed fraction may contain appreciable amounts of C₄ hydrocarbons. It is desirable to remove these hydrocarbon vapors through line 51 to absorber vessel 50, where they flow countercurrent to a stream of oil injected through the top of the absorber by line 52. The unabsorbed vapors from vessel 50 may be removed from the system via outlet 53. The rich absorber oil from vessel 50 may be withdrawn through line 54 and returned to the top of quench tower 24 to serve as a quenching oil therein. The oil falling to the bottom of tower 24 is removed through line 55 containing pump 56 and the stream split, with a portion being added to the oil flowing in line 54 by means of connection 57 and the mixture used as the quenching oil and the remainder flowing through branch line 58 to stripping tower 59. In the stripping tower, the lighter constituents are removed from the oil and returned to the quenching tower through line 60 and the lean oil is removed via line 52 containing pump 61 and passed into absorber tower 50. If desired, a make-up lean oil may be added to the oil being circulated in line 54 by inlet 62. The water quenching tower 25 is conventional, and is provided with water circulating line 63 containing pump 64.

The following is given as a specific example illustrating the practice of the present invention. A mixture of butylenes was heated to a temperature in the range between 1100° to 1250° F. prior to passage over a dehydrogenation catalyst which included nickel-chromium phosphate. Steam heated to a similar temperature was employed as a diluent for the reaction. The operation was conducted in cycles with one hour on reaction and one hour on regeneration. Thus a cycle length totalled two hours. Regeneration was accomplished by passing a mixture of air and steam over the catalyst during the period of one hour on the regeneration portion of the cycle. The pressures employed were in the range from 0 to 10 pounds per square inch. The foregoing operation was conducted with the steam being pretreated in the zone equivalent to pretreating zone 14. A comparison run was conducted with the pretreating zone eliminated. The data in the following table shows respectively the conventional operation without the pretreating zone 14 and the practice of the present invention employing pretreating zone 14 with activated alumina as the absorbent.

|  | Without Alumina | With Alumina |
|---|---|---|
| Hydrocarbon, V./V./Hour | 148 | 126 |
| Steam, V./V./Hour [1] | 3,070 | 2,970 |
| Air, V./V./Hour | 286 | 318 |
| Catalyst Age, Hours | 0–52 | 0–60 |
| Cycle Length, Hours | 2 | 2 |
| Average Catalyst Temperature, °F | 1,128 | 1,106 |
| Conversion, Per Cent [2] | 23.3 (20–26) | 21.0 (19–24) |
| Selectivity, Mol Per Cent [2] | 81.2 (88–78) | 91.6 (93–91) |
| Temperature Required for Conversion | 1,165 | 1,151 |
| Selectivity at 30% Conversion | 79 | 88 |

[1] Reaction and regeneration.
[2] Uncorrected for polymer, acetylenes, and regeneration $CO_2$.

It will be apparent from the foregoing data that when the steam diluent is pretreated in accordance with the present invention, the temperature required for a 30% conversion for a comparable operating period is reduced by 14° F. and the selectivity at 30% conversion is increased by 9%. It is also apparent from the data that, with a lower catalyst temperature as allowed by the present invention, the operation may be conducted for a longer period than in conventional operations since the temperature may be gradually raised as the catalyst efficiency is lowered. Since the present invention allows lower average catalyst temperatures, it is apparent that the temperature may be raised over a longer operating time than was possible heretofore to the maximum temperature allowable in the dehydrogenation reaction.

The selectivity increase also shows that greater amounts of the desirable product may be obtained in the practice of the present invention than was obtainable heretofore.

Although the example illustrates the effectiveness of activated alumina as a pretreating medium in a reaction involving contact with nickel-chromium phosphate catalyst, it will be apparent that a nickel-chromium phosphate catalyst itself may be used as a pretreating medium since observations have been made that the nickel-chromium phosphate catalyst is a good absorbent for iron and its compounds.

As another example of the application of the present invention in the dehydrogenation of butadiene from normal butylenes is the employment of a catalyst comprising magnesium oxide, iron oxide, and potassium and copper oxides. This catalyst is employed in proportions of 80% magnesium oxide, 14% iron oxide, 3% potassium oxide, and 3% copper oxide. In the particular instance when this type of catalyst is employed, it may be employed in pretreating zone 14 or the dehydrogenation zone 21. As another example, a catalyst comprising 90% iron oxide, 5% potassium oxide and 5% of copper oxide may be employed in the pretreating zone 14 and the dehydrogenation zone 21. In the last two examples, the two catalysts mentioned may be employed in dehydrogenation zone 21 and activated alumina or other absorbents of the type mentioned above may be used in the pretreating zone 14. The process steps when employing the catalyst used in the preceding examples are similar to those employed when using the nickel-chromium phosphate catalyst except that air is omitted during the regeneration step. When employing the predominantly iron oxide catalyst, higher steam to hydrocarbon ratios are necessary and the reaction is continuous, the regeneration cycle being omitted since the latter catalyst does not require regeneration.

When using either the predominantly magnesium oxide or iron oxide catalyst in the foregoing examples, it will be apparent that iron, since it is a component of the catalyst, will not be the poison to the reaction. In this particular instance the poisons introduced into the reaction zone 21 are chlorides which may be present either in the hydrocarbon or the steam. It is well known that commercial steam ordinarily includes chlorides in view of the presence of salts of various metals in water used for generating steam. In the practice of the present invention, it is possible to provide a substantially chloride-free steam for employment as a diluent for the reaction.

Similarly, chlorides may be present in the hydrocarbon feed and in these particular instances it may be desirable to pass the steam-hydrocarbon feed mixture rather than the steam alone through the pretreating zone 14. This may be accomplished by locating the pretreating zone 14 in line 19 rather than as shown in the drawing. The presence of chlorides in the hydrocarbon feed may also be encountered when the hydrocarbon feed is obtained from a catalytic process using halogens such as methyl chloride, aluminum chloride, or hydrogen chloride as diluents, catalyst, or promoters for various catalytic reactions.

It will be further understood that the preceding examples are given only by way of illustration and not by way of limitation. Instead of the dehydrogenation catalysts used in the example, any suitable catalyst may be employed which is known to the dehydrogenation art. Similarly, the temperatures of the dehydrogenation reaction are not to be restricted to those given in the examples but may be varied from approximately 1100° to 1300° F. if desired.

The present invention has been described and illustrated by reference to dehydrogenation of butylenes to butadiene and is given for purposes of illustration and is not intended as a limitation of the broad invention disclosed herein. The pretreating operation in which the diluent for a catalytic conversion operation is freed of poisons for the reaction is believed to be applicable to a wide variety of processes employing diluents. As examples of other catalystic processes to which the present invention may be applicable may be mentioned catalytic conversion in the presence of hydrogen as diluent such as illustrated by the hydroforming and hydrogenation processes.

While steam has been described and illustrated as a diluent for the reaction, it is within the scope of the present invention to employ other diluents for the reaction. For example, it may be desirable to employ nitrogen and other relatively inert gases in lieu of steam. The inert gases should be substantially unaffected by the dehydrogenation catalyst and should serve to reduce the partial pressure of the hydrocarbons in the reaction zone. As examples of the types of diluents other than steam which may be used for the reaction may be mentioned hydrocarbons such as methane, ethane, propane, and nitrogen, carbon dioxide and the like.

The nature and objects of the present invention having been fully described and illustrated, what I wish to claim as new and useful and to secure by Letters Patent is:

1. A method for producing butadiene which includes the steps of heating a mixture of butylenes to a temperature in the range between 1100° and 1300° F., heating a diluent for the reaction to a temperature in the range of 1100° and 1300° F., contacting the heated diluent with a bed of solid absorbent material to remove iron, its compounds, and other foreign materials therefrom, forming a mixture of the contacted diluent with the heated butylenes, passing the mixture through a bed of a dehydrogenation catalyst and recovering a product including butadiene therefrom.

2. A method in accordance with claim 1 in which the diluent is steam.

WILSON D. SEYFRIED.

REFERENCES CITED

The following references are of record in the file of this patent:

UNITED STATES PATENTS

| Number | Name | Date |
|---|---|---|
| 2,242,627 | Strickland | May 20, 1941 |
| 2,265,641 | Grosskinsky et al. | Dec. 9, 1941 |
| 2,269,028 | Liedholm et al. | Jan. 6, 1942 |
| 2,322,857 | Liedholm et al. | Jan. 29, 1943 |